May 9, 1933.   J. R. MADEIRA   1,908,434
LOADING MACHINE
Filed Oct. 6, 1930   11 Sheets-Sheet 3

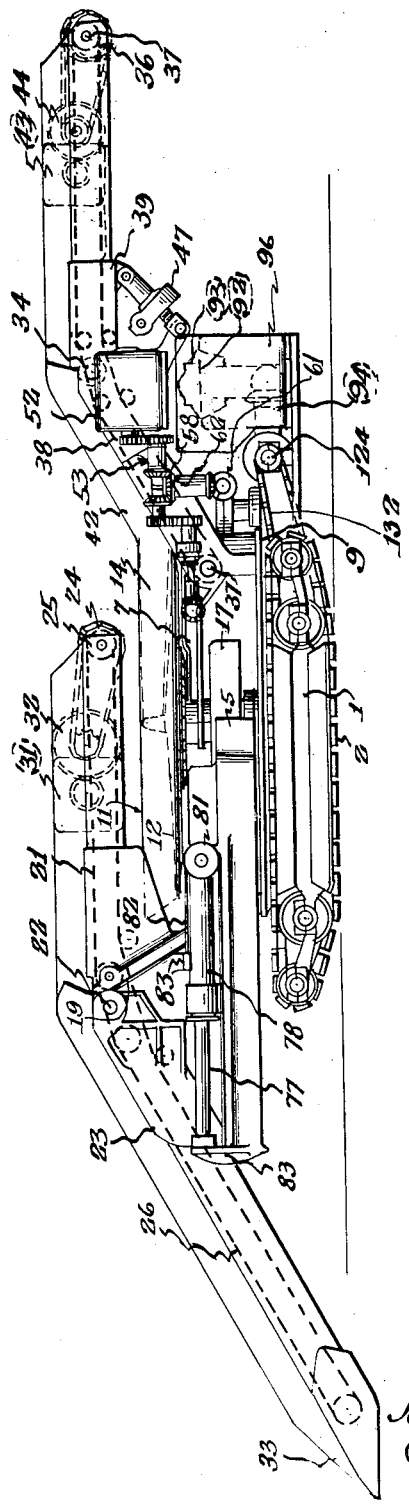

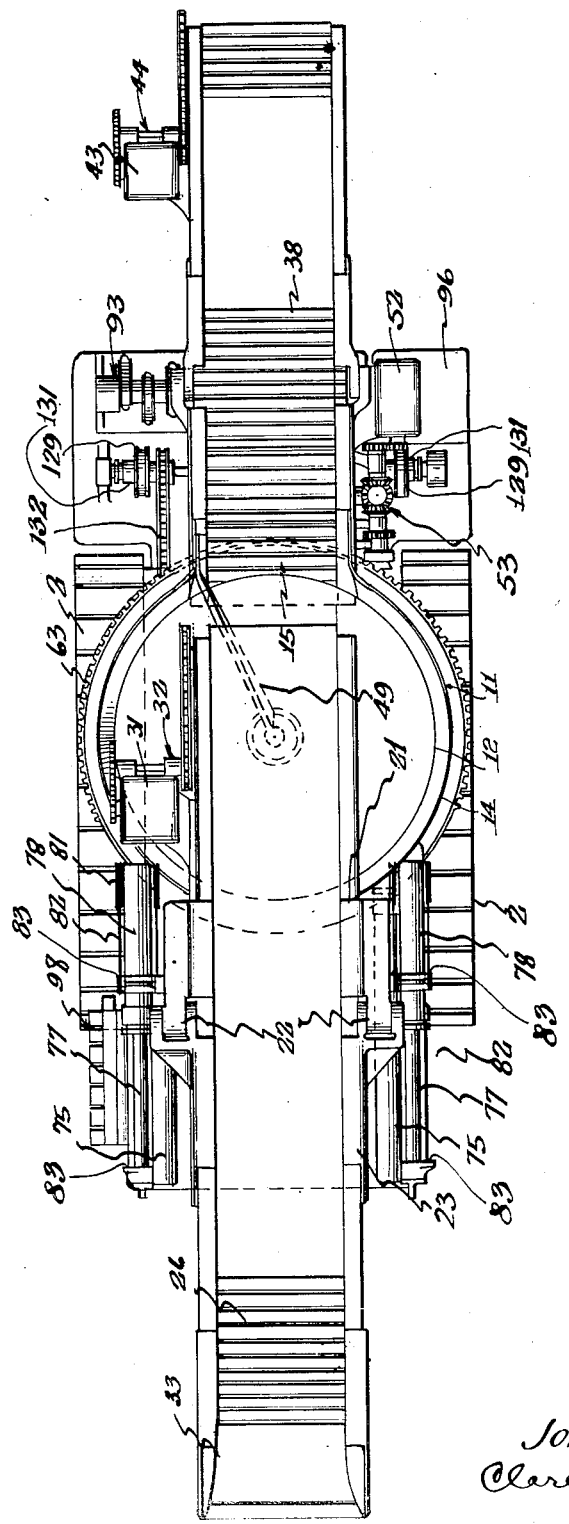

Inventor
John R. Madeira
Clarence F. Poole
Attorney

May 9, 1933. J. R. MADEIRA 1,908,434
LOADING MACHINE
Filed Oct. 6, 1930 11 Sheets-Sheet 4
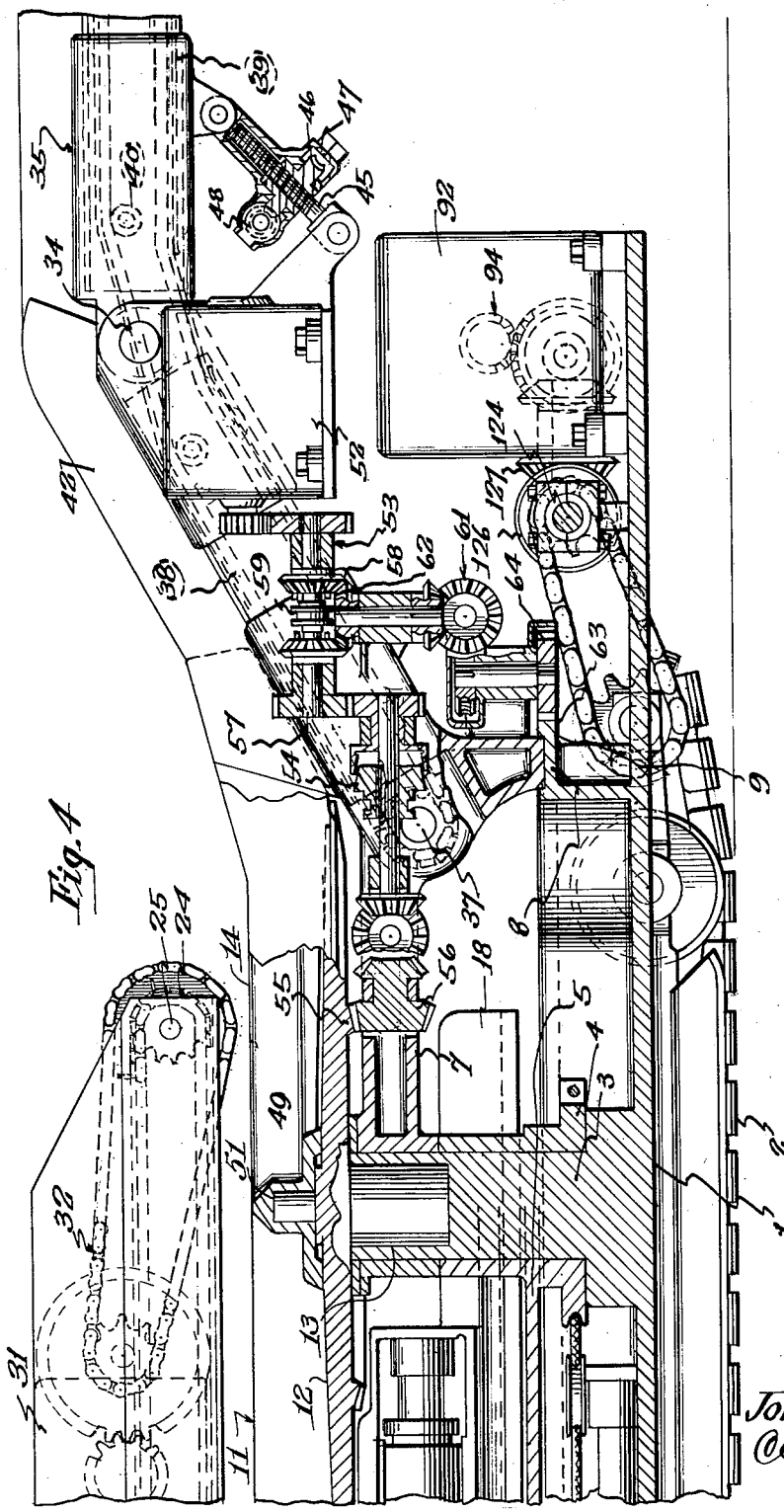

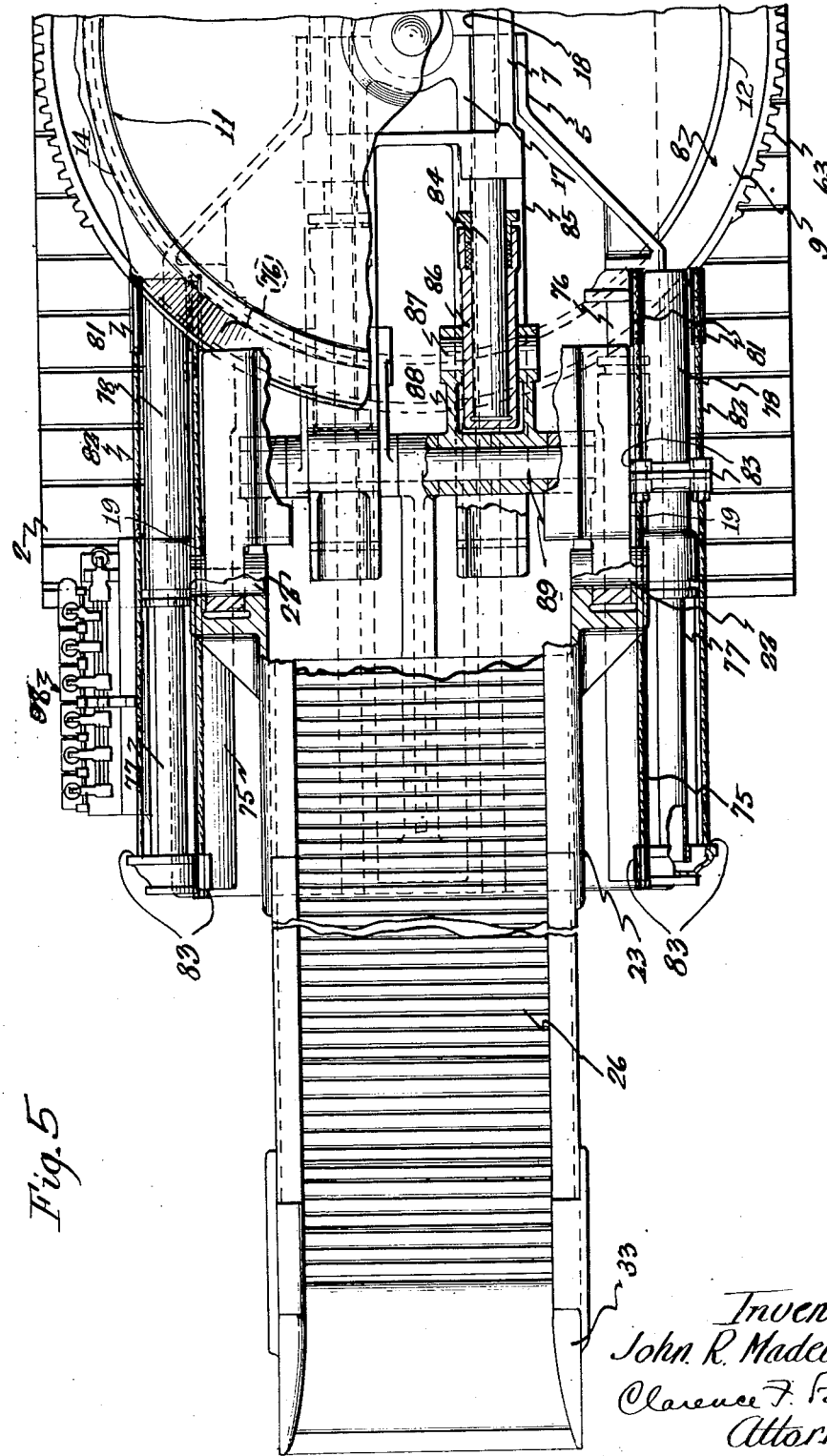

May 9, 1933. J. R. MADEIRA 1,908,434
LOADING MACHINE
Filed Oct. 6, 1930 11 Sheets-Sheet 6

Inventor
John R. Madeira
Clarence F. Poole
Attorney

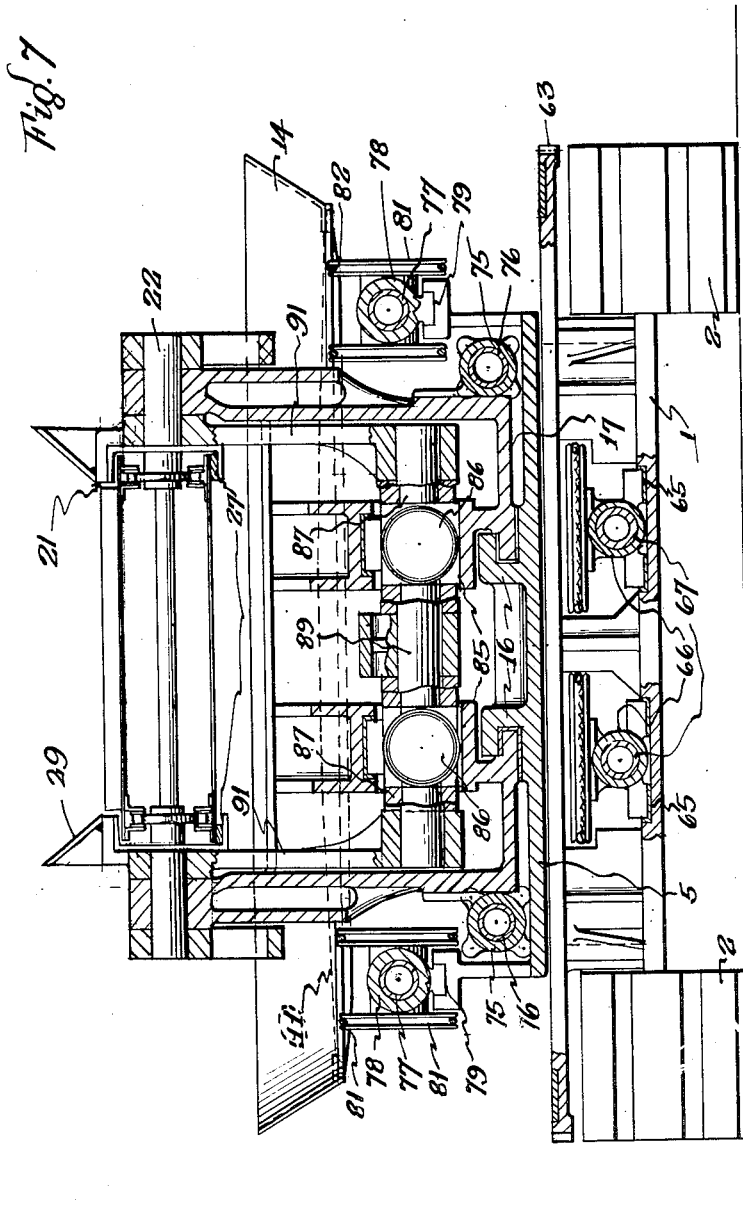

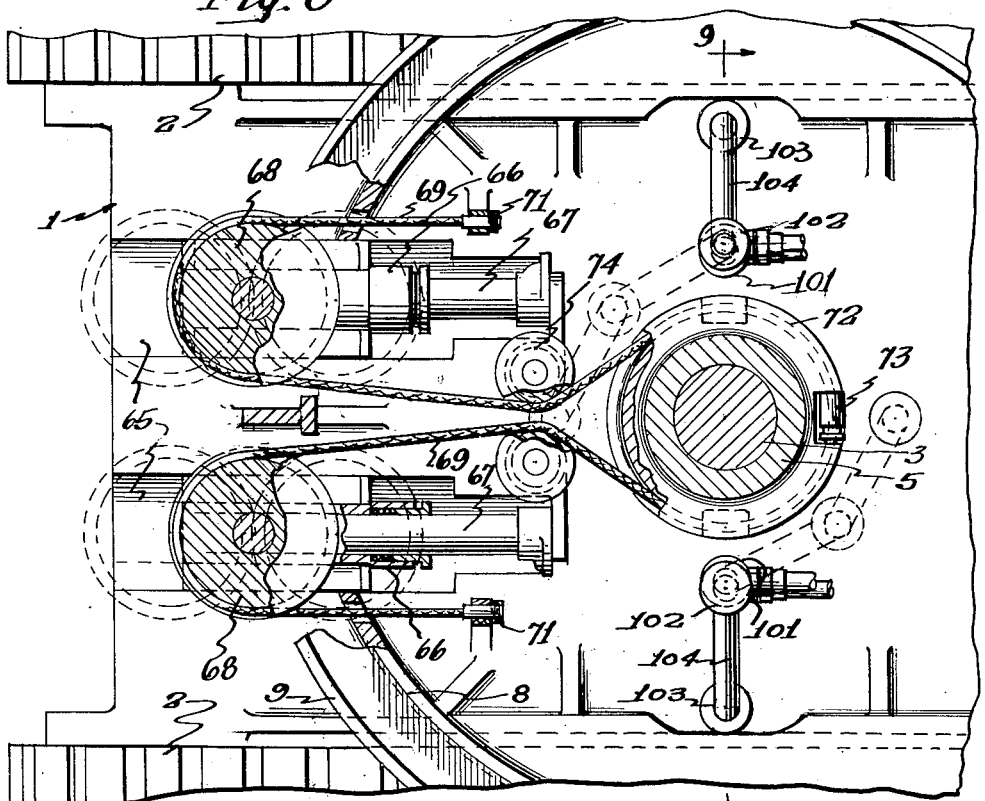
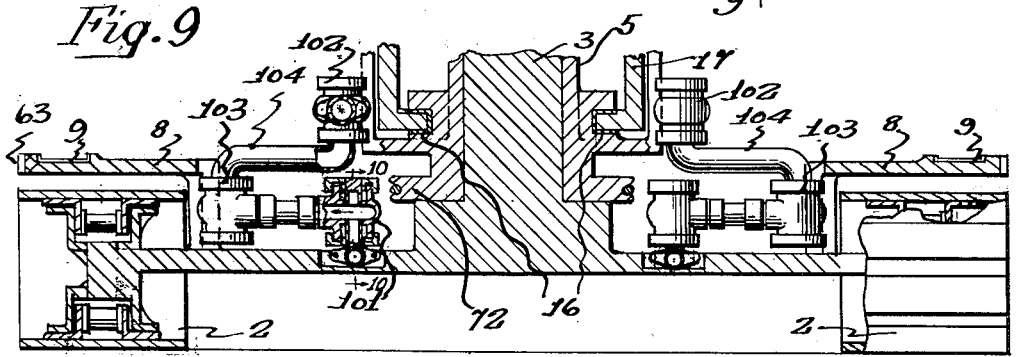
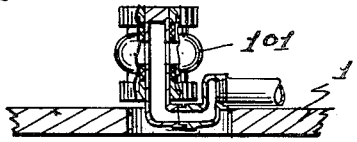

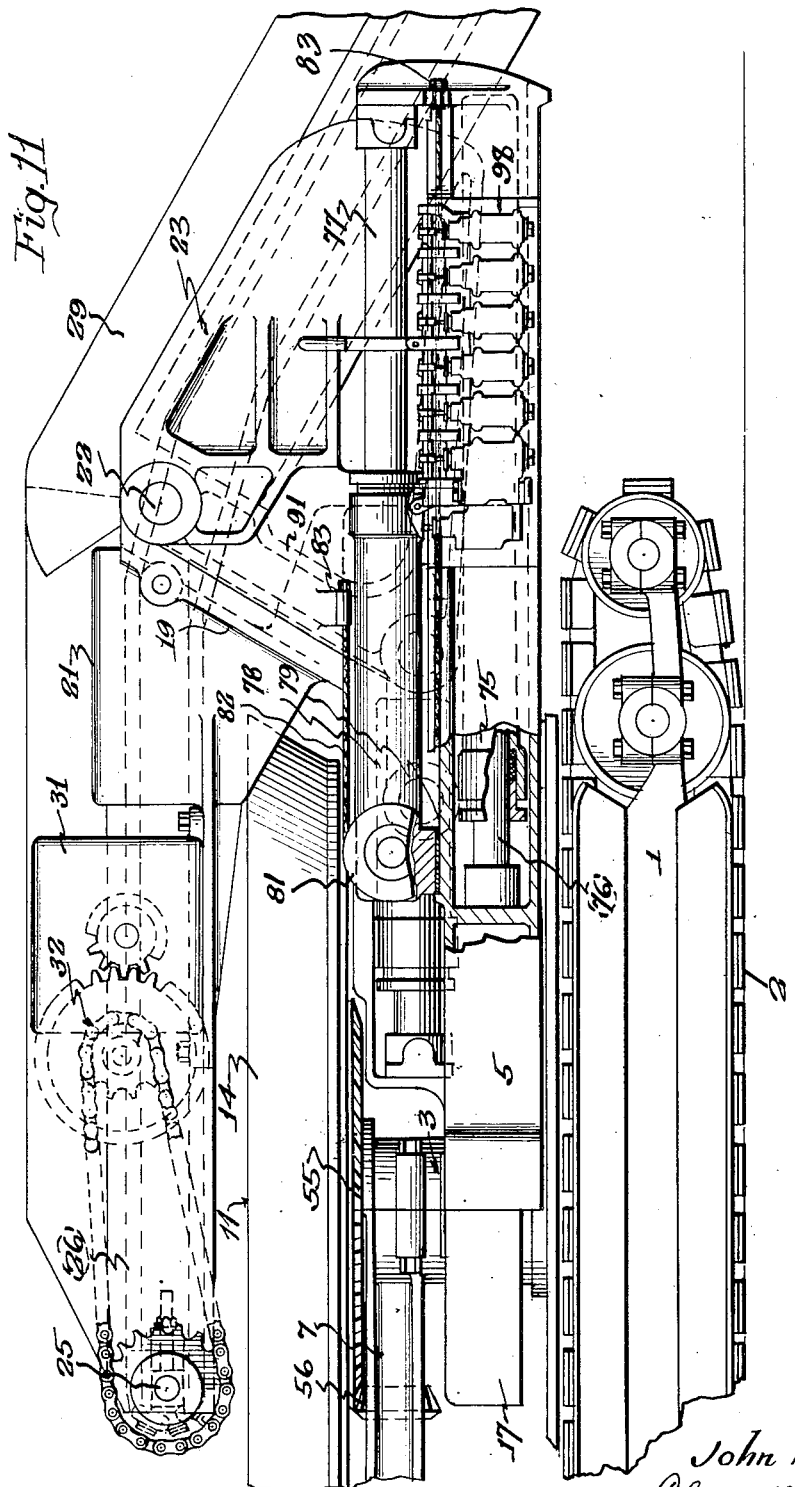

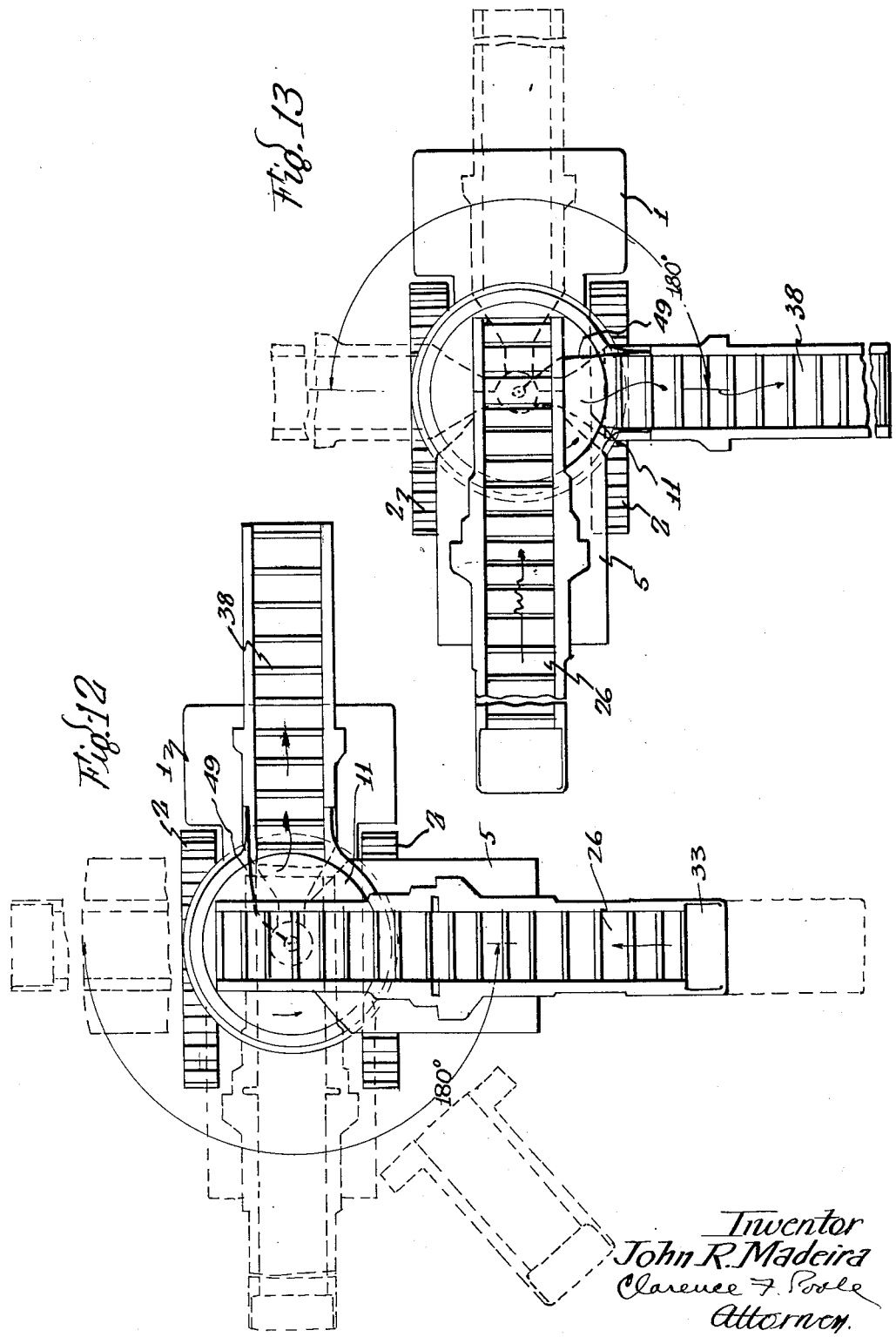

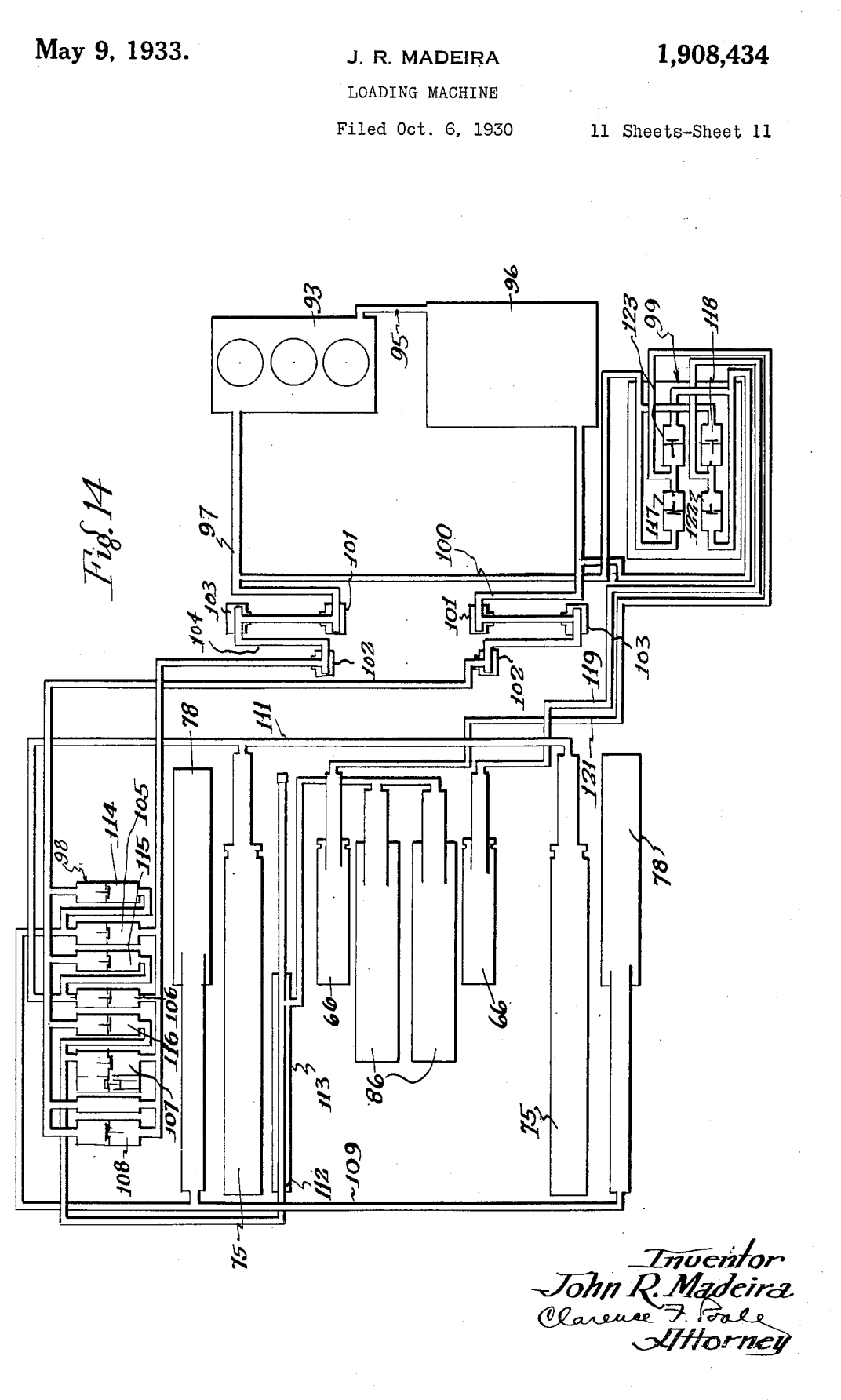

May 9, 1933.　　　J. R. MADEIRA　　　1,908,434
LOADING MACHINE
Filed Oct. 6, 1930　　11 Sheets-Sheet 11

Fig.14

Inventor
John R. Madeira
Clarence F. Poole
Attorney

Patented May 9, 1933

1,908,434

UNITED STATES PATENT OFFICE

JOHN R. MADEIRA, OF CHICAGO, ILLINOIS, ASSIGNOR TO GOODMAN MANUFACTURING COMPANY, OF CHICAGO, ILLINOIS, A CORPORATION OF ILLINOIS

LOADING MACHINE

Application filed October 6, 1930. Serial No. 486,628.

My invention relates particularly to loading machines for underground mining, although not limited to this use alone, and has for its general objects the provision of a loading machine of the digging type which is capable of face digging, of discharge while digging, and of storage of material between periodic discharge, all with a view toward a loading machine which is capable of efficient operation particularly under the conditions encountered in underground mining.

The invention will be better understood by reference to the accompanying drawings in which:

Figure 1 is a side elevation of a loading machine embodying my invention;

Figure 2 is a plan view of the same;

Figure 3 is an enlarged central rearwardly and forwardly extending vertical sectional view of the intermediate portion of the machine;

Figure 4 is a similar view of the rearward portion of the machine;

Figure 7 is a transverse sectional view substantially on the line 7—7 of Figure 3;

Figure 8 is a partial sectional view substantially on the line 8—8 of Figure 3;

Figure 9 is a partial sectional view substantially on the line 9—9 of Figure 8;

Figure 10 is a partial section on the line 10—10 of Figure 9;

Figure 11 is an enlarged side elevation of the intermediate portion of the machine and taken oppositely with respect to Figure 1 and having parts broken away and shown in section;

Figures 12 and 13 are diagrammatic plan views of the machine showing parts thereof in different positions of their movement; and Figure 14 is a diagram of the hydraulic system of the machine.

Like characters of reference indicate like parts in the several views.

Figure 5:
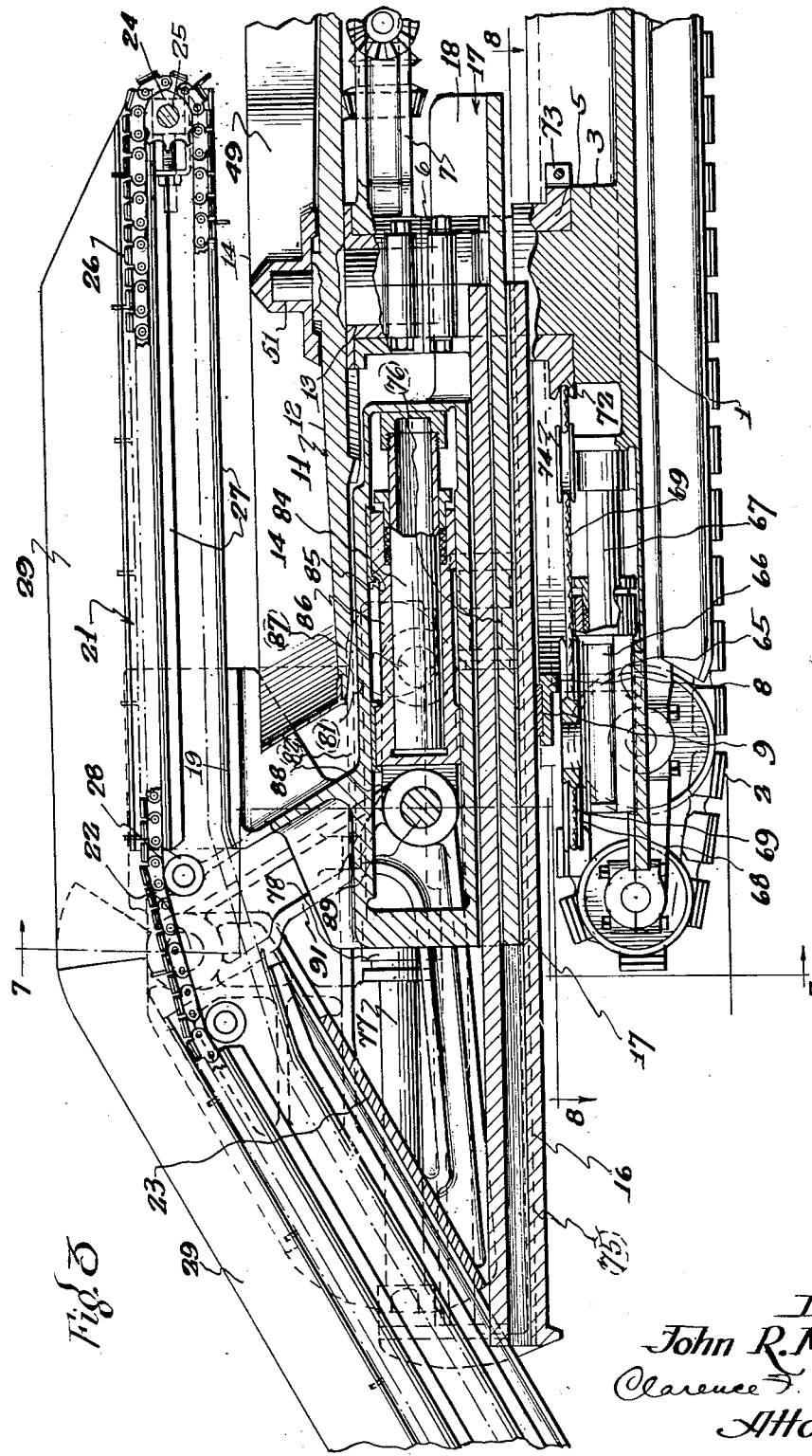
Figure 5 is an enlarged plan view of the forward portion of the machine with parts broken away and shown in section.

Referring to the drawings, 1 designates a base which is disposed horizontally and which is supported on transversely spaced forwardly and rearwardly extending continuous tread devices 2 by means of which the machine may be moved from place to place, (see Figs. 1 and 2).

The base is provided with a column 3 uprising centrally therefrom, (see Figs. 3 and 4), and rotatably mounted on said column immediately above said base, as designated at 4, is a frame 5, and rotatably mounted on said column immediately above said frame 5, as designated at 6, is a second frame 7, the base 1 being provided with a circular upwardly projecting flange 8 coaxial with the column 3 and of large diameter and providing outboard bearings 9 for the frames 5 and 7. Thus, are the frames 5 and 7 mounted on the base 1 for independent angular movement in a horizontal plane with respect thereto.

Figure 6:
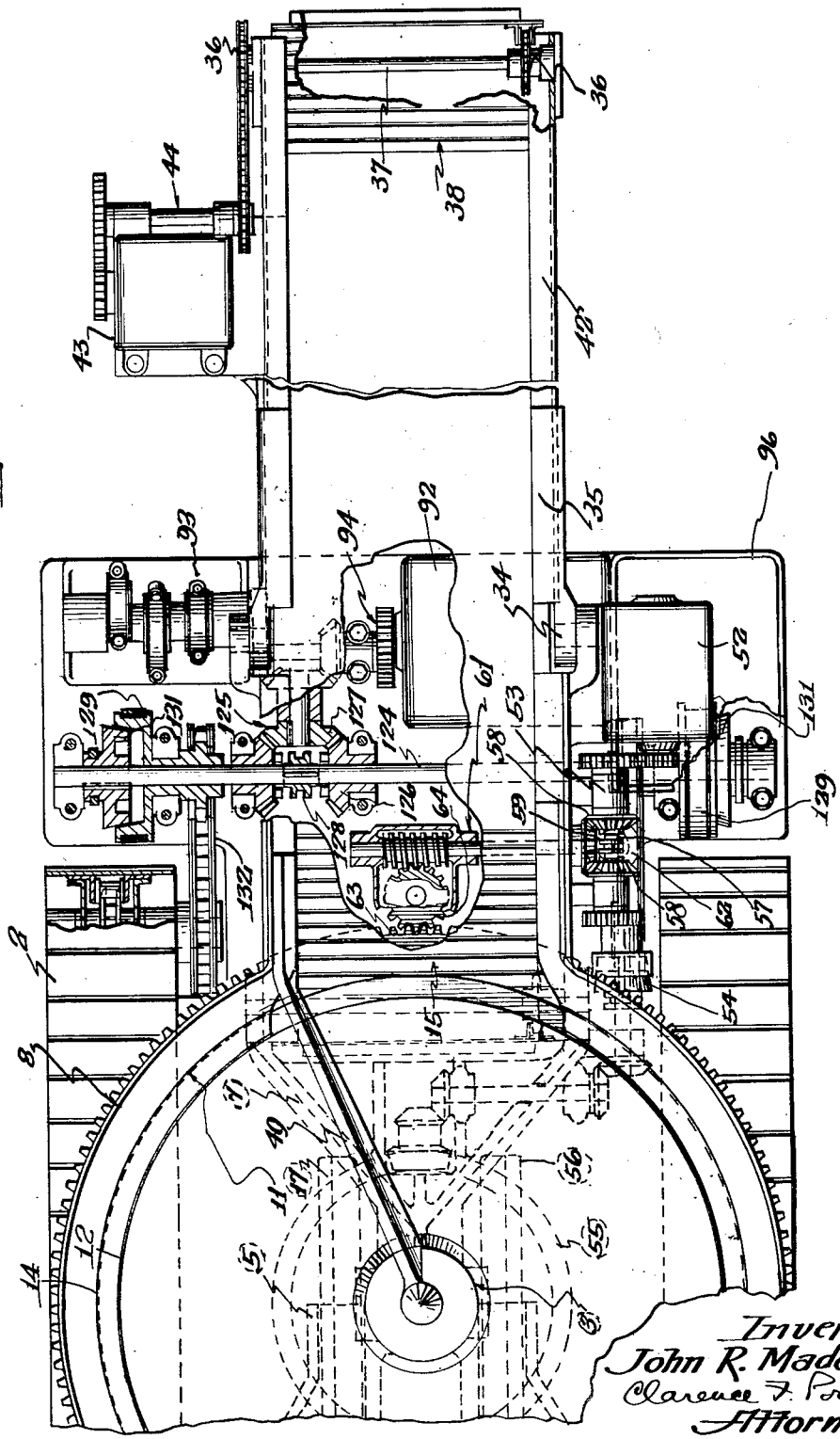
Figure 6 is an enlarged plan view of the rearward portion of the machine with parts broken away and shown in section.

Disposed immediately above the portions of the frames 5 and 7 at and adjacent the bearings 4 and 6 is a horizontally disposed generally circular receptacle of relatively large diameter, generally designated at 11, and comprising a bottom 12 disposed upwardly on the column 3 and rotatably mounted thereon, as designated at 13, and a relatively stationary side wall 14 uprising from the bottom and provided with a discharge opening 15, (see Figs. 3, 4 and 6).

The frame 5 extends horizontally and radially from the column 3 and this portion of the frame 5 is provided with correspondingly extending oppositely facing slide bearings 16 arranged on opposite sides of the column 3, (see Figs. 3, 4 and 7). Engaged in the slide bearings 16 for horizontal movement radially of the column 3 is a frame 17 which is provided with an opening 18 through which the column 3 passes.

The frame 17 is provided at its outer end with an upwardly projecting portion 19 beyond the receptacle 11, and at the upper end of the portion 19, with an inwardly or rearwardly extending elevated horizontal portion 21 overlying the receptacle 11 and disposed radially thereof and in parallelism with the slide bearings 16 of the frame 5.

Pivotally mounted at its rear end, as designated at 22, on a horizontal axis transverse to the extent of the frame 5 and extending the portion 21 thereof radially of the column 3, is an outwardly or forwardly extending frame 23 which, as a result of its pivotal mounting 22, is angularly movable in a vertical plane with reference to the frame 17.

Trained about sprockets 24 mounted on transverse shafts 25 at the rear or inner end of the elevated horizontal portion 21 of the frame 17 and at the forward or outer end of the frame 23 is an endless conveyor chain belt 26, the stretches of which are supported for longitudinal movement on suitable guides 27 and rollers 28 adjacent the pivot mounting 22, said guides and rollers being suitably carried with the frames 17 and 23, (see Figs. 1, 3, 4 and 7).

The frame portion 21 and the frame 23 are provided with conveyor side walls 29 at the sides of the belt 26, and the belt is driven to move the upper stretch thereof rearwardly or inwardly, to convey material from the front or outer end of the frame 23 to the rear end of the frame portion 21 from which the material is discharged into the receptacle 11, by means of an electric motor 31 mounted at one side of the frame portion 21 and operatively connected with the adjacent sprocket shaft 25 by means of a gear and sprocket chain reduction drive connection generally indicated at 32, (see Figs. 1, 2, 3 and 4).

Thus, the rear portion of this conveyor is disposed horizontally and moves over the receptacle 11 with movement of the frame 17 with reference to the frame 5, the arrangement being such that the inner or rear end of the conveyor is always positioned over the receptacle 11 for the discharge of material thereinto.

The front portion of this conveyor being carried with the frame 23 is angularly movable in a vertical plane, and this conveyor is angularly movable horizontally by angular movement of the frame 5 about the column 3.

The forward or front end of the frame 23 is provided with a forwardly facing scoop 33, the conveyor side walls 29 being extended forwardly to form sides thereof.

It will be observed that, by reason of the movement of the frames 5, 17 and 23, the scoop 33 may be given horizontal angular, vertical angular and forward and rearward linear movement, thus providing for shoveling and particularly face digging, the material being moved rearwardly from the scoop by the conveyor belt 26 for discharge into the receptacle 11.

The aforementioned frame 7 extends, radially of the column 3, obliquely upward and outward from a point inwardly adjacent the periphery of the receptacle 11, and pivotally mounted at the elevated outer end of the frame 7, as designated at 34, on a horizontal axis transverse to the extent of the frame 7, is an outwardly or rearwardly extending frame 35 which, as a result of its pivotal mounting 34, is angularly movable in a vertical plane with reference to the frame 7, (see Figs. 1 and 4).

Trained about sprockets 36 mounted on transverse shafts 37 at the inner end of the aforesaid oblique portion of the frame 7 and at the outer or rear end of the frame 35 is a second endless conveyor chain belt 38, the stretches of which are supported for longitudinal movement on suitable guides 39 and rollers 40 adjacent the pivot mounting 34, these guides and rollers being suitably carried with the frames 7 and 35, (see Figs. 1, 3, 4 and 6).

The oblique portion of the frame 7 and the frame 35 are provided with conveyor side walls 42 at the sides of the belt 38, and this belt is driven to move the upper stretch thereof rearwardly or outwardly, to convey material discharged from the receptacle 11 through the discharge opening 15 thereof to the rear or outer end of the frame 35 from which the material is discharged, say into a mine car, by means of an electric motor 43 mounted at one side of the frame 35 and operatively connected with the adjacent sprocket shaft 37 by means of a gear and sprocket chain reduction drive connection generally indicated at 44, (see Figs. 1, 2 and 3).

The frame 35 is adjustable vertically on the pivot 34 for various discharging or loading conditions and is adjustably positioned by means of a screwthreaded rod 45 pivotally mounted on an extension of the frame 7, a bored worm wheel 46 screwthreaded on the rod 45 and journaled in a housing 47 pivotally mounted on the frame 35, and a manually operated worm 48 journaled in the housing 47 and meshing with the worm wheel 46, (see Figs. 1 and 4).

As before stated the bottom 12 of the receptacle 11 is rotatable, and a relatively stationary radial vane 49 has its bored inner end rotatably engaged on an upwardly extending axial pilot 51 on the bottom 12, (see Fig. 3) and, extending radially therefrom, has its outer end extending to and secured with one of the conveyor side walls 42 on the frame 7 at one side of the discharge opening 15 of the side wall 14 of the receptacle, (see Fig. 6). The side wall 14 of the receptacle is secured with the conveyor side walls 42 at the sides of the discharge opening 15, and, together with the vane 49, is pivotally movable with the frame 7 on the axis of the column 3.

Rotation of the bottom 12 of the receptacle 11 in the proper direction, i. e., counter-clockwise in Figure 6, causes material in the receptacle to be directed by the relatively stationary vane 49 through the discharge opening 15 onto the conveyor belt 38 which carries the material outwardly or rearwardly for discharge, the rear conveyor being angularly movable horizontally about the receptacle 11 for discharging material at a desired position.

The bottom 12 of the receptacle 11 is rotated by means of an electric motor 52 mounted on the outer end of the frame 7 at one side thereof and a driving train, generally indicated at 53, which is inclusive of a manually controlled friction clutch 54 and which terminates in a downwardly facing bevel gear 55 on the bottom 12 and driven by a bevel pinion 56, (see Figs. 4 and 6).

The driving train 53 is also inclusive of a counter-shaft 57 upon which are rotatably mounted opposing bevel gears 58 alternately driven from the shaft 57 by means of a manually controlled positive clutch member 59 slidably keyed on the shaft 57 and alternately engageable with the gears 58.

A driving train, generally indicated at 61, serves to operate the frame 7 in its horizontal angular movement from either of the gears 58 and is inclusive of a bevel gear 62 meshing with both of the gears 58 and a gear segment 63 on the flange 8 of the base 1 and disposed concentrically with the column 3, and a pinion 64 carried with the frame 7 and meshing with the segment 63.

The frames 5, 17 and 23, as shown, are operated by hydraulic means now to be described.

The frame 5 is operated in its horizontal angular movement about the column 3 in the following manner, (see Figs. 3, 7 and 8).

Slidably mounted on the front portion of the base 1 in forwardly and rearwardly extending slides 65 are two horizontally spaced rearwardly facing cylinders 66, and fixed on the base are two forwardly extending pistons 67 which are engaged in the cylinder 66.

Mounted on the cylinders 66 on vertical axes are two rotatable sheaves 68, and a cable 69 has its ends anchored on the base, as designated at 71, and has its portions adjacent its ends trained over the sheaves 68 and has its intermediate portion trained about a grooved sheave portion 72 on the lower end of the hub of the frame 5 which surrounds the column 3.

The cable 69 is intermediately fixed with the frame 5, as designated at 73, and guide sheaves 74 engage the cable 69 between the sheaves 68 and the sheave portion 72.

Fluid pressure in either of the cylinders 66 effects angular movement of the frame 5 in the corresponding direction while the sealing of both cylinders locks the frame 5 with the base, the fluid pressure in these cylinders being effected as hereinafter described.

The frame 17 is operated in its horizontal movement radially of the column 3 in the following manner, (see Figs. 5, 7 and 11).

Fixed on the frame 17 are two rearwardly facing cylinders 75 disposed to the sides of the forward conveyor, and fixed on the frame 5 are two forwardly extending pistons 76 which are engaged in the cylinders 75, so that fluid pressure in the cylinders 75 effects forward or outward movement of the frame 17 with reference to the frame 5.

Fixed on the frame 5 are two rearwardly extending pistons 77 disposed to the sides of the forward conveyor and engaged in cylinders 78 which are mounted for longitudinal movement in guides 79 on the frame 5.

Mounted on the rear ends of the cylinders 78 are pairs of coaxial sheaves 81 about which are trained cables 82 having their opposite ends anchored on the frames 5 and 17, as designated at 83, so that fluid pressure in the cylinders 78 effects rearward or inward movement of the frame 17 with reference to the frame 5.

Thus alternation of fluid pressure in the cylinders 75 and 78 effects outward and inward movement of the frame 17 while the sealing of these cylinders locks the frame 17 with the frame 5, the fluid pressure in these cylinders being effected as hereinafter described.

The frame 23 is operated in its vertical angular movement in the following manner, (see Figs. 3, 5 and 7).

Fixed on the frame 17 are two horizontally spaced forwardly extending pistons 84, and mounted in guides 85 on the frame 17 for forward and rearward movement are two cylinders 86 in which the pistons 84 are engaged.

Trunnioned on the cylinders 86 on a horizontal axis, as designated at 87, are forwardly extending links 88, the forward ends of which are bored parallel with the trunnions 87 and engaged for pivotal movement on a shaft 89.

The frame 23 is provided at its rear end with downwardly projecting arms 91 which are bored and engaged on the shaft 89, whereby longitudinal movement of the cylinders 86 in the guides 85 effects vertical angular movement of the frame 23 and the front portion of the front conveyor, fluid pressure in the cylinders 86 causing upward movement of the frame 23, release of fluid pressure in these cylinders causing downward movement of this frame, and sealing of these cylinders causing the holding of the frame 23 in various desired vertical positions of adjustment.

Controlled fluid pressure is provided for the fluid pressure cylinders above described in the following manner.

Transversely arranged on a rearward extension of the base 1 is an electric motor 92 and a hydraulic pump 93 driven from the motor 92 through a driving train generally indicated at 94, (see Figs. 1, 2, 4 and 6).

The pump 93 pumps fluid through a pipe 95, (see Fig. 14) from a tank 96 suitably mounted on the base 1, and fluid pressure is conducted from the pump 93 through piping 97 to a set of manually operated control valves generally indicated at 98 and mounted on the frame 5 (see Fig. 5), and to another set of manually operated control valves generally indicated at 99 (see Fig. 14) and suitably mounted on the base 1.

Fluid in the system is returned under low pressure to the tank 96 from the valves 98 and 99 through piping 100, and (see Figs. 8, 9, 10 and 14) the piping 97 and 100 are each inclusive of a swivel joint 101 carried on the base, a second swivel joint 102 carried on the frame 5, and a third swivel joint 103 connected to the joints 101 and 102 by short pipes 104, the arrangement being such that angular movement of the frame 5 with reference to the base 1 is permitted as will be apparent in Figures 8 and 9.

The high pressure piping 97 leads to three selecting valves 105, 106 and 107, and to a throttle valve 108 of the valves 98, and the valve 105 is connected with the cylinders 78 by a pipe 109, the valve 106 with the cylinders 75 by a pipe 111, and the valve 107 with the cylinders 86 by a pipe 112 for selectively controlling fluid pressure from the pump in these cylinders, the pipe 112 being inclusive of a slip joint 113 arranged to permit horizontal lineal movement of the frame 17 with reference to the frame 5, (see Fig. 14).

The low pressure piping 100 leads to three release valves 114, 115 and 116 and the throttle valve 108 of the valves 98, and the valve 114 is connected with the cylinders 78 by the pipe 109, the valve 115 with the cylinders 75 by the pipe 111, and the valve 116 with the cylinders 86 by the pipe 112.

The portion of the high pressure piping 97 adjacent the pump 93 leads to two selecting valves 117 and 118 of the valves 99, and the valve 117 is connected with one of the cylinders 66 by a pipe 119 and the valve 118 with the other cylinder 66 by a pipe 121.

The portion of the low pressure piping 100 adjacent the tank 96 leads to two release valves 122 and 123 of the valves 99, and the valve 122 is connected by the pipe 119 with the same cylinder 66 as is the valve 117, and the valve 123 is connected with the other cylinder 66 by the pipe 121.

In idling condition the throttle valve 108 is open thus by-passing the fluid from the high pressure piping 97 into the low pressure piping 100, and in this condition the selecting and release valves are manipulated after which the throttle valve is closed to develop the fluid pressure.

Each of the selecting valves and its associated release valve cooperates in controlling the fluid pressure in the cylinder or cylinders with which they are connected, the throttle valve 108 being utilized to prevent pressure in the high pressure piping 97 until a selecting valve is opened after which the throttle valve is closed to develop the pressure.

Further description of the valve mechanism above described is not necessary, it being well known and not requiring detailed description herein.

The continuous tread devices 2 are operated from the pump motor 92, for the bodily movement of the machine, in the following manner, (see Figs. 4 and 6).

A transverse drive shaft 124 is mounted on the base 1 immediately forward of the pump motor 92, and this shaft is selectively driven in either direction from this motor by a driving train, generally indicated at 125, and including opposing bevel gears 126 rotatably mounted on the shaft 124 and meshing with a bevel drive pinion 127 and a clutch member 128 slidably keyed on the shaft 124 and alternately engageable with the gears 126.

Mounted on the shaft 124 adjacent the ends thereof are friction clutches comprising friction members 129 rotatable on the shaft and cooperating friction members 131 slidably keyed on the shaft for engagement and disengagement with the friction members 129, the friction members 129 being connected with adjacent tread devices 2 for driving the same by means of sprocket and chain driving devices 132.

The frames 5 and 7 are each capable of 180 degrees of angular movement as will be observed from Figures 12 and 13 with the result that the machine is capable of meeting a wide range of conditions, particularly with reference to underground mining.

A detailed explanation of the operation of the machine is not necessary as it will be obvious to anyone skilled in the art, but it will be noted that the machine is capable of face digging, of discharge while digging, and of storage between periodic discharge.

While I have herein shown and described one embodiment of my invention, it will be understood that the construction and arrangement of the various parts may be altered or changed without departing from the spirit or scope of my invention. Furthermore, I do not wish to be construed as limiting myself to the specific form illustrated herein, excepting as it may be particularly limited in the appended claims.

I claim as my invention:

1. In a loading machine, the combination of a horizontally disposed receiving receptacle including a rotating bottom, a conveyor for carrying material therefrom, a second conveyor having its inner end overlying said receptacle for discharging material thereinto, power operated means for moving said conveyors independently angularly horizontally about said rotating bottom, and power operated means for moving said second conveyor longitudinally with reference to said rotating bottom.

2. In a loading machine, the combination of a horizontally disposed generally circular receiving receptacle having a rotating bottom of relatively large diameter, a conveyor for carrying material therefrom, a second conveyor disposed radially of said receptacle and having its inner end overlying said receptacle for discharging material thereinto, power operated means for moving said conveyors independently angularly horizontally about said rotating bottom, and power operated means for moving said second conveyor longitudinally with reference to said receptacle.

3. In a loading machine, a portable base, a horizontally disposed generally circular receiving receptacle having a rotating bottom of relatively large diameter mounted on said base, a conveyor for carrying material therefrom, a second conveyor mounted on said base and disposed radially of said receptacle and having its inner end portion disposed horizontally and overlying said receptacle for discharging material thereinto, power operated means for moving the outer end portion of said second conveyor angularly in a vertical plane with reference to said inner end portion thereof, power operated means for moving said conveyors independently angularly horizontally about said rotating bottom, and power operated means for moving said second conveyor longitudinally with reference to said receptacle.

4. In a loading machine, the combination of a horizontally disposed generally circular receptacle of relatively large diameter comprising a revolving bottom and a relatively stationary side wall having a discharge opening, a relatively stationary radial vane overlying said bottom for directing material from said bottom through said discharge opening, a conveyor for carrying material from said receptacle through said opening, a second conveyor disposed radially of said receptacle and having its inner end portion disposed horizontally and having its inner end overlying said receptacle for discharging material thereinto, power operated means for moving the outer end portion of said second conveyor angularly in a vertical plane with reference to said inner portion, power operated means for moving said first mentioned conveyor, said side wall and said vane being angularly movable horizontally together about said bottom, power operated means for moving said second conveyor angularly horizontally about said receptacle, and power operated means for moving said second conveyor longitudinally with respect to said receptacle.

5. In a loading machine, the combination of a horizontally disposed generally circular receiving receptacle comprising a revolving bottom and a relatively stationary side wall having a discharge opening, a conveyor for carrying material from said receptacle through said discharge opening, a relatively stationary vane overlying said bottom for directing material from said bottom through said opening, a second conveyor disposed radially of said receptacle and having its inner end overlying said receptacle for discharging material thereinto, power operated means for moving said first mentioned conveyor, said side wall and said vane being angularly movable horizontally together about said bottom, power operated means for moving said second conveyor angularly horizontally about said receptacle, and other power operated means for moving said second conveyor longitudinally with respect to said receptacle.

6. In a loading machine, the combination of a horizontally disposed generally circular receiving receptacle having a relatively large diameter and provided with a revolving bottom, a conveyor for carrying material therefrom, a relatively stationary radial vane overlying said bottom for directing material from said bottom to said conveyor, a second conveyor disposed radially of said receptacle and having its inner end portion disposed horizontally and having its inner end overlying said receptacle for discharging material thereinto, power operated means for moving the outer end portion of said second conveyor angularly in a vertical plane with reference to said inner portion thereof, power operated means for moving said first mentioned conveyor and said vane angularly horizontally together about said bottom, power operated means for moving said second conveyor angularly horizontally about said receptacle, and power operated means for moving said second conveyor longitudinally with reference to said receptacle.

7. In a loading machine, the combination of a horizontally disposed generally circular receiving receptacle provided with a revolving bottom, a conveyor for carrying material therefrom, a relatively stationary radial vane overlying said bottom for directing material from said bottom to said conveyor, a second conveyor disposed radially of said receptacle and having its inner end overlying said receptacle for discharging material thereinto, power operated means for moving said first mentioned conveyor and said vane angularly horizontally together about said bottom, power operated means for moving said second conveyor angularly horizontally about said receptacle, and other power operated means for moving said second conveyor longitudinally with reference to said receptacle.

8. In a loading machine, a portable base, a horizontally disposed generally circular receiving receptacle provided with a revolving bottom mounted on said base, a conveyor for carrying material therefrom mounted on said base for pivotal movement with respect thereto about an axis coaxial with the axis of rotation of said bottom, a relatively stationary vane overlying said bottom for directing material from said bottom to said conveyor, a second conveyor mounted on said base and disposed radially of said receptacle and having its inner end overlying said receptacle for discharging material thereinto, power operated means for moving said second conveyor angularly horizontally about said receptacle, and other power operated means for moving said second conveyor longitudinally with reference to said receptacle.

9. In a loading machine, the combination of a base provided with a column uprising therefrom, a horizontally disposed receptacle including a bottom rotatably mounted on the top of said column, a conveyor for carrying material from said receptacle, a second conveyor having its inner end overlying said receptacle for discharging material thereinto, and a frame rotatably mounted on said column below said bottom for effecting angular horizontal movement of said second conveyor.

10. In a loading machine, the combination of a base provided with a column uprising centrally therefrom, a horizontally disposed generally circular receptacle of relatively large diameter including a bottom rotatably mounted on the top of said column, a conveyor for carrying material from said receptacle, a second conveyor disposed radially of said receptacle and having its inner end overlying said receptacle for discharging material thereinto, a frame rotatably mounted on said column below said bottom for effecting angular horizontal movement of said second conveyor, and a second frame slidably mounted on said rotatably mounted frame for horizontal movement radially of said receptacle for effecting longitudinal movement of said second conveyor.

11. In a loading machine, the combination of a base provided with a column uprising centrally therefrom, a horizontally disposed generally circular receptacle of relatively large diameter including a bottom rotatably mounted on the top of said column, a conveyor for carrying material from said receptacle, a second conveyor disposed radially of said receptacle and having its inner end overlying said receptacle for discharging material thereinto, a frame rotatably mounted on said column below said bottom for effecting angular horizontal movement of said second conveyor, a second frame slidably mounted on said rotatably mounted frame for horizontal movement radially of said receptacle for effecting longitudinal movement of said second conveyor and provided with an elevated rearwardly extending horizontal portion overlying said receptacle and carrying the inner portion of said second conveyor, and a third frame pivotally mounted on said second frame intermediate of said second conveyor on a horizontal axis transverse to said second conveyor and carrying the outer portion of said second conveyor for pivotal movement in a vertical plane.

12. In a loading machine, a portable base, a horizontally disposed generally circular receptacle mounted on said base comprising a revolving bottom and a relatively stationary side wall having a discharge opening, a conveyor mounted on said base for carrying material from said receptacle through said discharge opening, a relatively stationary vane overlying said bottom for directing material from said bottom through said opening, and power operated means for moving said conveyor, said side wall and said vane angularly horizontally together about said bottom.

13. In a loading machine, the combination of a base provided with a column uprising centrally therefrom, a horizontally disposed generally circular receptacle arranged upwardly on said column and provided with a revolving bottom, a conveyor for carrying material from said receptacle, a relatively stationary vane overlying said bottom for directing material from said bottom to said conveyor, a frame rotatably mounted on said column below said receptacle and power operated means for rotating said frame about said column and a connection between said vane and said frame whereby said conveyor and said vane are angularly movable together about said bottom.

14. In a loading machine, the combination of a base provided with a column uprising centrally therefrom, a horizontally disposed generally circular receptacle comprising a revolving bottom and a relatively stationary side wall having a discharge opening, a conveyor for carrying material from said receptacle, a relatively stationary vane overlying said bottom for directing material from said bottom to said conveyor, and a frame rotatably mounted on said column below said receptacle, power operated means for rotatably moving said frame about said column and a connection between said frame and said side wall and said conveyor whereby said conveyor, said side wall and said vane are angularly movable together about said bottom.

15. In a loading machine, the combination of a base provided with a column uprising therefrom, a horizontally disposed receptacle arranged on the top of said column, two conveyors for respectively carrying material from and discharging material into said receptacle, and means for supporting said conveyors on said base comprising two frames rotatably mounted on said column below said receptacle for independent movement and power operated means to effect independent horizontal angular movement of said conveyors about said column.

16. In a loading machine, the combination of a base provided with a column uprising therefrom, a horizontally disposed receptacle including a bottom mounted on the top of said column for rotation with respect thereto, two conveyors for respectively carrying material from and discharging material into said receptacle, and means for supporting said conveyors on said base comprising two frames rotatably mounted independently on said column below said bottom and power operated means for effecting independent horizontal angular movement of said conveyors about said rotatable bottom.

17. In a loading machine, the combination of a base provided with a column uprising centrally therefrom, a horizontally disposed receptacle including a bottom mounted on the top of said column, two conveyors for respectively carrying material from and discharging material into said receptacle, means for supporting said conveyors on said base comprising two frames rotatably mounted on said column below said receptacle for independent movement and power operated means to effect horizontal angular movement of said conveyors about said receptacle, and a third frame slidably mounted on one of said frames radially thereof and other power operated means for effecting longitudinal movement of the conveyor which discharges material into said receptacle.

18. In a loading machine, the combination of a base provided with a column uprising centrally therefrom, a horizontally disposed receptacle including a bottom rotatably mounted on the top of said column, two conveyors for respectively carrying material from and discharging material into said receptacle, two frames rotatably mounted on said column below said receptacle for independent movement to effect horizontal angular movement of said conveyors about the axis of said receptacle, and a third frame slidably mounted on one of said frames radially thereof for effecting longitudinal movement of the conveyor which discharges material into said receptacle and provided with an opening through which said column passes.

19. In a loading machine, the combination of a base provided with a column uprising centrally therefrom, a horizontally disposed generally circular receptacle of relatively large diameter including a bottom rotatably mounted on the top of said column, a conveyor for carrying material from said receptacle, a second conveyor disposed radially of said receptacle and having its inner end overlying said receptacle for discharging material thereinto, a frame rotatably mounted on said column below said bottom for effecting angular horizontal movement of said second conveyor, a second frame slidably mounted on said rotatably mounted frame below said receptacle for horizontal movement radially of said receptacle for effecting longitudinal movement of said second conveyor and provided with an elevated horizontal portion overlying said receptacle and carrying the inner portion of said second conveyor, a third frame pivotally mounted on said second frame intermediate said second conveyor on a horizontal axis transverse to said second conveyor and carrying the outer portion of said second conveyor for pivotal movement in a vertical plane, a fourth frame rotatably mounted on said column below said bottom for effecting angular horizontal movement of said first mentioned conveyor and carrying the inner portion thereof inclined upwardly from said receptacle, and a fifth frame pivotally mounted on said fourth frame intermediate said first mentioned conveyor on a horizontal axis transverse to this conveyor and carrying the outer portion of this conveyor for pivotal movement in a vertical plane.

Signed at Chicago, in the county of Cook and State of Illinois, this 3d day of October 1930.

JOHN R. MADEIRA.